United States Patent [19]

Moore et al.

[11] 4,163,374

[45] Aug. 7, 1979

[54] REFRIGERATABLE BEVERAGE CONTAINER HOLDER

[75] Inventors: Stanley R. Moore; Thomas L. Crisman; Donald R. Zivney, all of Dallas, Tex.

[73] Assignee: Freeze Sleeves of America, Inc., Dallas, Tex.

[21] Appl. No.: 862,970

[22] Filed: Dec. 21, 1977

[51] Int. Cl.² ............................................. F25D 3/08
[52] U.S. Cl. ................................... 62/457; 220/85 H; 220/412
[58] Field of Search ...................... 220/412, 426, 85 H; 62/457, 530, 371

[56] References Cited

U.S. PATENT DOCUMENTS

| | | | |
|---|---|---|---|
| 3,302,427 | 2/1967 | Stoner et al. | 62/457 |
| 3,302,428 | 2/1967 | Stoner et al. | 62/457 |
| 3,360,957 | 1/1968 | Paquin | 62/457 |
| 3,417,573 | 12/1968 | Warner | 220/426 |
| 3,680,330 | 8/1972 | Canosa | 62/457 |
| 3,703,816 | 11/1972 | Weathers | 62/457 |
| 3,715,895 | 2/1973 | Devlin | 62/457 |

*Primary Examiner*—Ronald C. Capossela
*Attorney, Agent, or Firm*—Crisman & Moore

[57] ABSTRACT

Means for insulating and chilling a canned beverage such as beer or soft drink including a cylindrical cup-shaped liner structure disposed within a conventional foam beverage can holder and lying within a portion of the annular "dead air" cavity between a beverage can situated therein and the side walls of the foam holder. The outer wall of the inner cup wall and the inner wall of the outer foam cup walls define an annular space containing a reusable refrigerant. The reusable refrigerant is a freezable fluid, preferably a liquid chemically treated into a gellatenous state for being frozen in conventional refrigerator freezers. In the frozen state the gel will chill and keep chilled beverage disposed within a container placed within the inner cupshaped liner. The top portion of the liner is constructed for light press fit engagement with the side walls of the foam holder for sealably containing the gel therein in a non-frozen state. A conventional circular plastic ring closes the top intersecting edges between the foam holder and the inner liner and facilitates the entrapment of any dead air between the beverage container and the inner cup wall.

11 Claims, 7 Drawing Figures

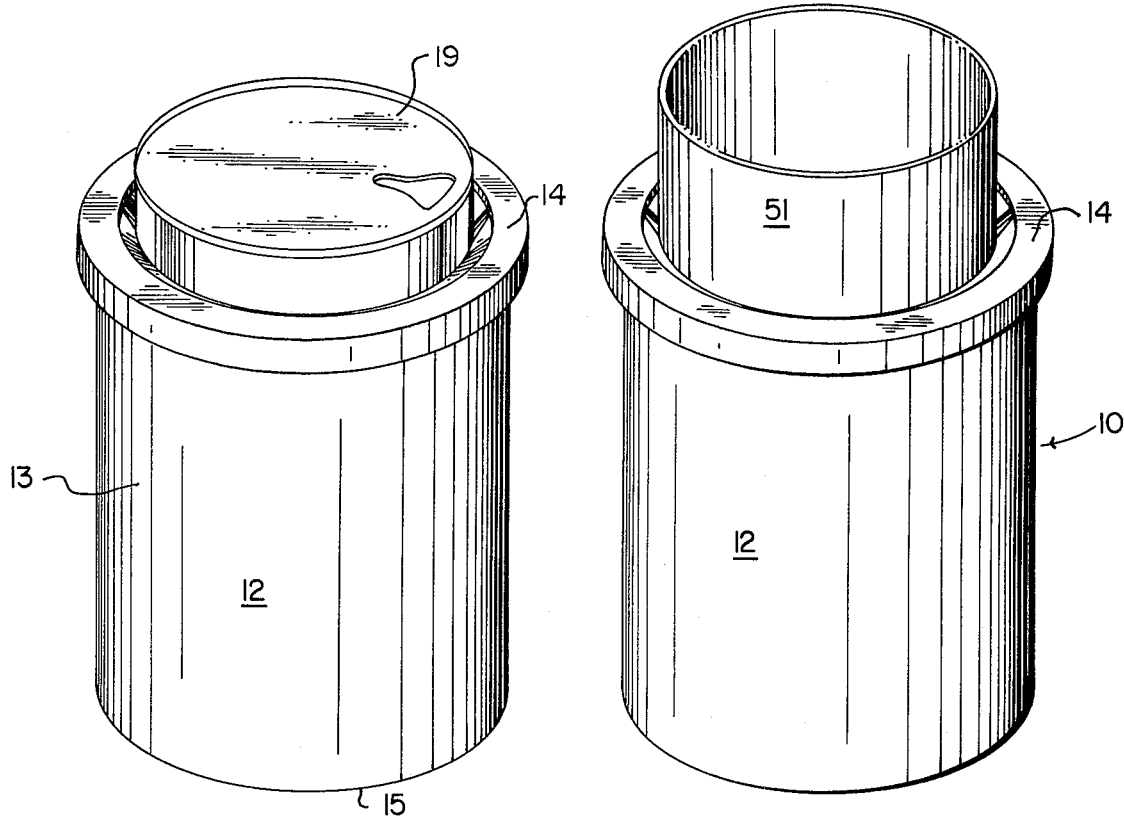
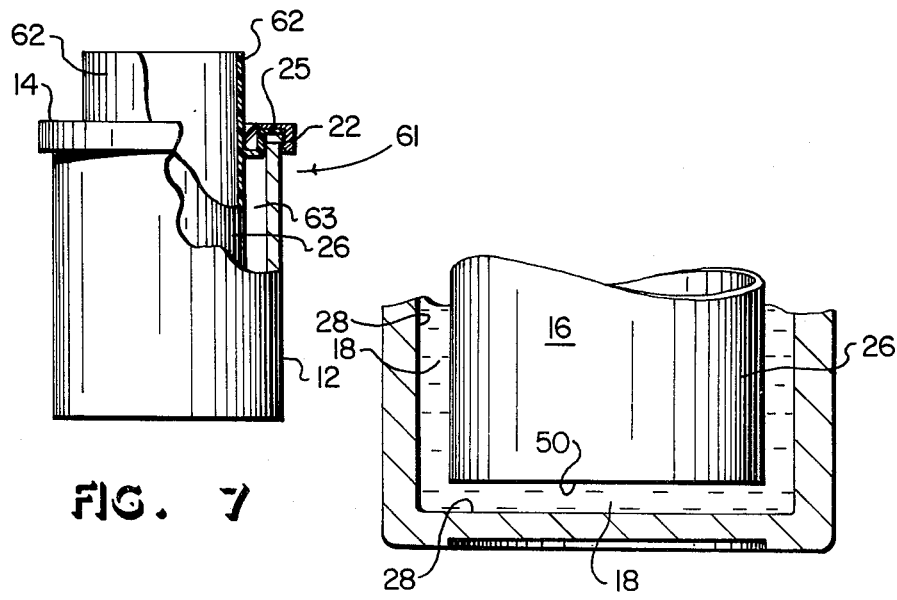

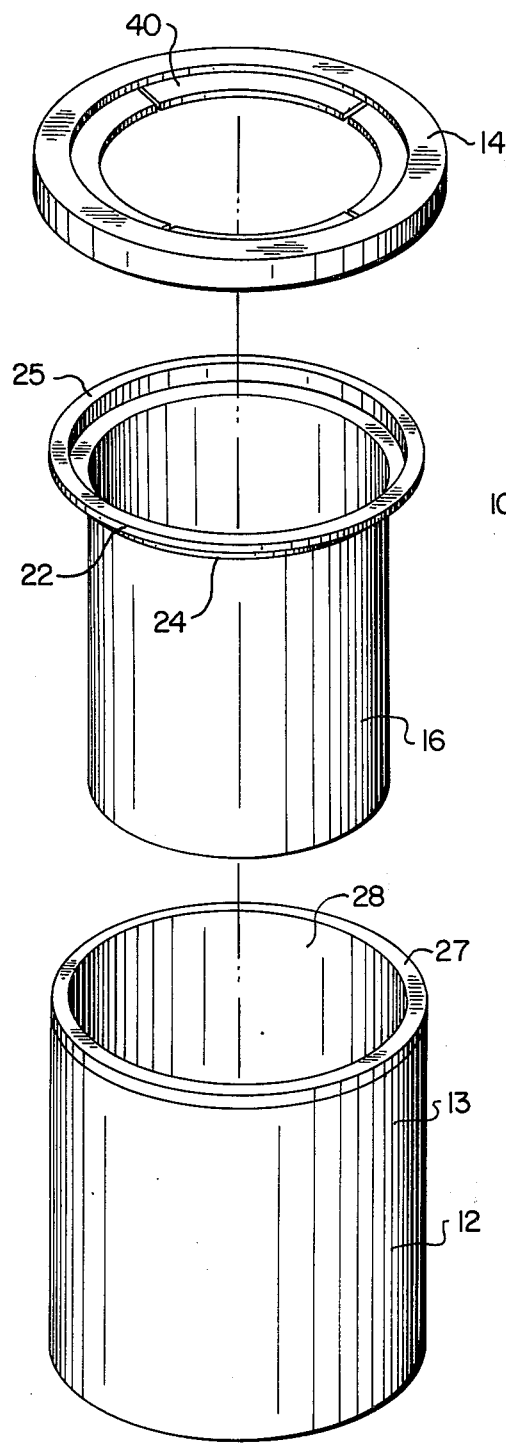
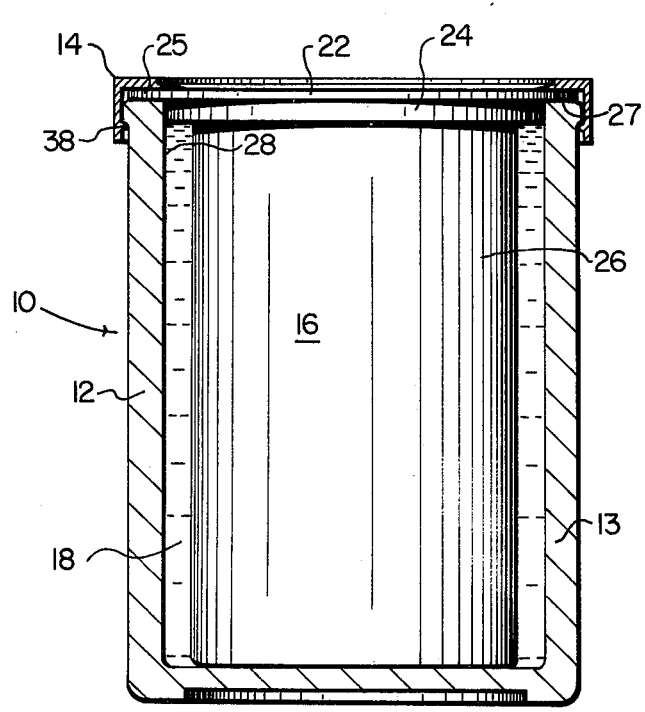
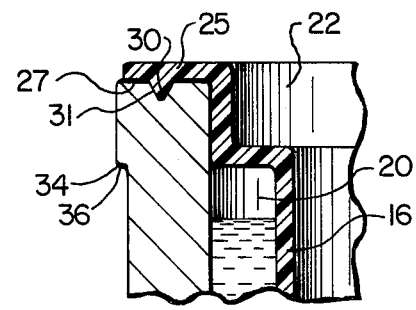
FIG. 2
FIG. 3
FIG. 4

REFRIGERATABLE BEVERAGE CONTAINER HOLDER

BACKGROUND OF THE INVENTION

The invention relates to a refrigeratable beverage container holder, and, more particularly, to a refrigeratable beverage container holder constructed with a sleeve of reusable refrigerant disposed between the walls of a conventional foam cup and a cup-shaped liner provided therein for receiving and circumferentially engaging a beverage container and thereby chilling the contained beverage.

It is conventionally desirable to consume most beverages such as soft drinks and particularly beer in a chilled state. Containers of such beverages are thus stored in refrigerated areas such as refrigerators, ice boxes or ice chests for sufficient periods of time prior to consumption to lower the temperature. Beverages such as soft drinks are often emptied from their containers into glasses or cups filled with ice to afford maximum chilling during consumption. The taste of most soft drinks is not rendered totally unpalatable by diluting water produced by the melting ice; however, ice cannot be added to beer or ale dur to the watering effect and the undesirable taste resulting therefrom. For this reason, beer is usually stored in refrigerators where the temperature is relatively low. Additionally, other means have been used such as placing the beverage in very thin, highly thermally conductive aluminum and steel walled cans to enhance the rate and extent to which a beverage may be cooled from an ambient temperature. Unfortunately, conventional refrigerators are not always kept at a temperature whereby the beverage is suitably chilled, regardless of its container, to a point near that of freezing. Unless the consumer wishes to place the beverage can or bottle in the refrigerator freezer to suitably chill it, a beverage such as beer is normally served "cool" but not "chilled". But neither beer nor soft drinks can be left in the freezer unattended since both would eventually freeze. For this reason, beer and many soft drinks are consumed directly from their containers in a less than desirable, partially chilled state.

The desirability of consuming beverages in as nearly a chilled state as possible has prompted the development of apparatus to insulate a chilled beverage container from the environment during consumption of the beverage. One such device of contemporary popularity is a beverage can holder comprised of a suitable foam material such as foamed polystyrene molded into an insulative cup configuration suitable for receiving a beverage can therein. Usually, a plastic ring is provided at the top of the insulative cup whereby the beverage can is disposed centrally therein with a dead air space therearound. The combination of the foam insulation characteristics and dead air space comprise a suitable means for maintaining the chilled condition of the beverage for some extended period of time. Such insulative cups, or beverage holders, are especially popular out of doors where an uninsulated beverage container will quickly absorb heat from the environment.

Certain problems exist with the aforesaid prior art "dead air" beverage holders. The beverage must initially be chilled. Once the beverage container is removed from its chilling environment it can only get warmer, and the insulated beverage container only retards this inevitable result. Aggravating the warming trend is the fact that the conventional beverage containers which are quickest to chill, i.e. those made of thin walled thermally conductive metal, are also the quickest to get warm. Beverages in glass containers warm somewhat slower in an ambient termperatured environment than aluminum, but not much. It may thus be seen that most all container materials have a relatively high rate of thermal conductivity to permit rapid cooling of the beverage in a refrigerator but which also operates to afford rapid heat absorption into the beverage once the container has been removed into an ambient temperature environment for consumption. It is therefore desirable to provide a low cost beverage holder which overcomes the aforesaid problems wherein a beverage in its original container can be consumed over an extended period of time at a constant and desirably chilled or cold temperature.

The prior art has provided refrigeratable beverage holders in various embodiments; however, such known embodiments are heavy, cumbersome, relatively expensive mug or stein-like devices. For example, one such device is shown and described in U.S. Pat. No. 3,302,428, issued on Feb. 7, 1977, therein illustrating a mug-shaped device for keeping cool a beverage in a container. The device of that invention is designed to receive beverage containers of various diameters and provides spring means for securing a snug contact with the walls of various sized beverage containers and although somewhat effective in cooling said beverages, is relatively expensive, heavy, cumbersome, bulky and mechanically complicated in comparison with conventional foam "dead air" beverage can holders.

The refrigerated beverage holder of the present invention is especially adapted for maintaining the chilled condition or cooling a beverage, within its own container, before and during consumption. The present invention overcomes many of the disadvantages of prior art, low cost, semi-disposable insulative beverage container holders as well as the heavier and more expensive refrigeratable beverage devices by providing means within a conventional foam beverage container holder which absorbs heat from the enclosed beverage container. In particular, in this manner the thermal conductivity aspects of this metal, especially aluminum and steel beverage containers are utilized to maintain the temperature of a beverage container as low, as long as possible; additionally, the invention may also be used to cool an ambient temperature beverage container below the temperature at which it was placed within the refrigerated beverage holder of the invention.

SUMMARY OF THE INVENTION

The invention relates to a low cost beverage container which includes a refrigerant for cooling a beverage disposed in the container. More particularly, one aspect of the invention involves an improved holder for a beverage container for chilled beverages wherein the holder is of the type including insulative foam side walls and being adapted for holding the beverage container therein. The improvement comprises a refrigerant, such as water, in a fluid of gellatenous state, disposed within the outer side walls of the holder wherein the refrigerant is adapted for absorbing heat energy from the container to secure a prolonged low temperature condition of the beverage. The refrigerant is of the type exhibiting a fluid state at temperatures above freezing and a solid state at temperatures at or below freezing, wherein the latent heat of fusion thereof permits advantageous absorptivity of heat from the container of the beverage.

In another aspect, the invention includes an improved refrigerated holder for a beverage container of the type including a cylindrical outer cup of insulative material closed on one end and open on the other. The circular edges of the open end is covered by a circular retaining ring including a top portion extending radially across the top edges and into the open end with radially inwardly extending flap portions defining a generally circumferentially extending edge to position a cylindrical beverage container in co-axial alignment with the outer cup, and a second cylindrical portion extending from the top of the outer cup down the outer wall thereof to retain the ring in position around the cup. The improvement comprises a cylindrical inner cup having an outer diameter less than the inner diameter of the outer cup to define an annular space therebetween. The inner diameter is adapted for receiving the cylindrical walls of a beverage container therein. The inner cup also includes a radially extending flange region at the open end for positioning adjacent the upper edges of the outer cup beneath the retaining ring to enclose the annular space therebeneath. A freezable fluid which is positioned within the annular space between the outer walls of the inner cup and the inner walls of the outer cup is first frozen or, less desirably, cooled very substantially, and then absorbs heat from the walls of a beverage container positioned within the inner cup to cool the beverage within the container.

Yet still another aspect of the invention includes a method of manufacturing a canned beverage holder including causing a freezable liquid, chemically treated to subsequently form a generally fluid gel, to flow into a defined space between a thermally conductive insert for receiving a beverage container and the side walls of an insulative holder. The fluid is then frozen. Once frozen and removed from a freezing environment, the formerly fluid, now frozen solid refrigerant tends to absorb heat contributing toward latent heat of fusion from an ice sleeve surrounding a beverage container placed within the insert and thereby chilling a beverage within the container. In an unfrozen state the freezable fluid gel will assist in sealing the adjacent bottoms of the insert and the holder from external air to create a "vacuum" and thereby tend toward retaining the insert in a fixed position within the insulative holder, further the relatively viscous gel and will not readily leak out from small cracks.

BRIEF DESCRIPTION OF THE DRAWINGS

For a more complete understanding of the present invention and for further objects and advantages thereof, reference may now be had to the following description taken in conjunction with the accompanying drawings, in which:

FIG. 1 is a perspective view of a prior art insulative "dead air" type beverage container holder in use;

FIG. 2 is a perspective exploded view of one embodiment of a refrigerated beverage container holder constructed in accordance with the principles of the present invention and illustrating the construction thereof;

FIG. 3 is an enlarged, side elevational view of the assembled beverage container holder of FIG. 2 taken along lines 3—3 thereof;

FIG. 4 is an enlarged fragmentary, side elevational view of an alternative embodiment of the upper flange of the beverage container holder of FIG. 3, further illustrating certain ones of the principles of the present invention;

FIG. 5 is an enlarged, fragmentary side elevational view of an alternate embodiment of an assembled beverage container holder as shown in FIG. 3;

FIG. 6 is a perspective view of the beverage container holder of the present invention having a cylindrical open top beverage container inserted therein; and FIG. 7 is a partially cut away side elevational view of an alternate, related embodiment of a certain aspect of the invention.

DETAILED DESCRIPTION

Referring first to FIG. 1, there is shown a perspective view of one embodiment of a currently popular prior art "dead air" type beverage holder which includes a cup 12 constructed from a light weight somewhat resilient insulative material such as styrofoam. The prior art cup 12 is of the type formed with cylindrical insulative walls 13 and a flat bottom 15 and is constructed of a closed cell foam, such as polystyrene or the like. A plastic ring lip 14 is provided atop the prior art cup 12 for securing a beverage container, such as can 19, generally centrally therein. The inside diameter of the cup 12 is greater than the diameter of the beverage can whereby a thermally insulated annulus of "dead air" is provided between the outer walls of the can 19 and the inner walls of the styrofoam cup 12. The can 19 containing a beverage is conventionally inserted into the prior art cup 12 in a preferably chilled condition and the styrofoam cup 12 retards the warming thereof during beverage consumption from the can 19.

Referring next to FIG. 2, there is shown one embodiment of a cup shaped liner 16 for utilization in the present invention wherein a refrigerant 18 is disposed in an annular configuration between the inner surface of the side walls 13 of a preferably styrofoam cup 12 and the outer surface of the outer walls of a thermally conductive cup shaped inner liner 16. The refrigerant 18 is provided within the (formerly) "dead air" annulus of the outer cup 12 for securement circumferentially about a beverage container disposed therein. The refrigerant 18 may be a fluid and, more particularly, liquid such as water in a gellatenous state. For example, in one presently preferable embodiment a viscosity control agent, such as methylcellulose, is added to water to form a gellatenous, freezable substance. During freezing, the refrigerator and 18 solidifies and thereby gives off its latent heat of fusion when exposed to sufficiently low temperatures such as the freezing compartment of conventional refrigerators. Once solidified, the refrigerant 18 is capable of absorbing heat from the beverage container and/or the environment around the assembled holder 10 of the present invention while chilling and keeping a beverage, such as beer, in its container desirably cold for consumption.

Referring now to FIG. 3, there is shown a side elevational, cross-sectional view of the assembled holder 10 of the present invention, wherein the liner 16 has been seated centrally within the foam cup 12. A ring 14 is disposed thereabove to further secure the assembled configuration which includes a refrigerant 18 disposed between the housing walls 13 and the liner 16. A small annular "dead air" space 20 may be left above the refrigerant 18 to allow for the expansion thereof during its solidification from a fluid state, however, most of the volumetric expansion of a water based fluid refrigerant upon freezing is compensated for by the resilient walls of the styrofoam outer cup 12. The cup shaped liner 16 (hereinafter sometimes referred to as the inner cup 16) includes a substantially flat, radial flange 25 at its upper, open end for positioning across the top edge 27 of the cup 12 (hereinafter sometimes referred to as the outer cup 12). Between the flange 25 and lower body 26 of the inner cup 16 there is formed a radially extending, flanged, or stepped region 22 having an outer cylindrical wall 24 preferably of a diameter slightly greater than the diameter of the upper edges of the inside walls 28 of the outer cup 12. In this configuration, the inner stepped region 22 is lightly press fitted into the outer cup 12 during assembly to centrally align it therein while substantially sealing it therearound. The term press fit is used herein to refer to light interference engagement between respective press fit surfaces. An interference between five and twenty thousandths of an inch has been shown to be satisfactory for centering and sealing such an assembly.

The diameter of the inner cup is preferably selected to snugly engage the walls of the largest convenient diameter beverage container to be used with the holder 10. Since the upper ring 14 conventionally includes the inwardly extending, deflectable flaps 40, even if the beverage container does not snugly engage the inner cup 16, the cold air formed therein is trapped by said flaps to facilitate the cooling of the beverage.

The construction of the inner cup 16 preferably includes the stepped portion 22 for a number of functional reasons. The outer wall 24 aligns the inner cup 16 with the outer cup 12 and permits a sealable interface therebetween. It should be noted that a bonding and sealing agent, such as an adhesive, may be utilized within said interface to further insure containment of the refrigerant 18, while in a less viscous (e.g., hot) state. Also, however, the stepped portion 22 permits the radial flaps 40, conventionally formed on the ring 14, to be utilized without interfering with the insertion of the beverage container. With the positioning of the inner cup 16 immediately beneath the ring 14, the radial flaps 40 must be provided with room to deflect downwardly without becoming wedged between the beverage container and the body 26. The stepped portion 22 thus facilitates this spacing by comprising a depth greater than the downward deflection of the flaps 40.

Referring now to FIG. 4, there is shown an alternative embodiment of the press fit assembly of the holder 10 of the present invention. Flange 25 of this particular embodiment is provided with a depending element or tongue 30 formed circumferentially therearound. The tongue 30 engages the top edge 27 of the outer cup 12 and embeds itself into the deformable foam material to form a groove 31 therein during assembly. The embedded tongue and groove configuration further secures the sealed relationship between the respective cups. The plastic ring 14 is not shown in FIG. 3 for purposes of clarity although it should be noted that said ring further secures the assembly by matingly engaging an outer cup lip 34 conventionally formed around the top thereof. The outer lip 34 forms a downwardly facing shoulder 36 therebeneath for engaging an inwardly facing collar 38 generally formed around the inner flange of the ring 14, as shown in FIG. 2.

The construction of the inner cup 16 shown in FIGS. 1, 2 and 3 is preferably of a material having a relatively high coefficient of thermal conductivity. However, since the wall thickness of the inner cup body 26 is preferably as thin as practicable to accomodate a maximum volume of refrigerant and to conduct thermal energy as rapidly as possible, most thin plastics, such as polypropelene, have been found to function satisfactorily. Such plastic materials can be readily molded into the desired configuration with conventional tooling.

It should be noted, however, that metal such as aluminum, steel and alloys thereof may be drawn and wall ironed with proper tooling much like beverage cans are manufactured, to provide the particular configuration of an inner liner 16 described herein and wherein thermal conductivity and space would be maximized. It is presently believed that inner liners 16 formed of relatively thin, highly conductive metal are among the most preferred embodiments of the invention.

Referring again now to FIGS. 2 and 3 one method of assembly of the holder 10 of the present invention will be addressed. First, an inner cup 16 is provided having a body portion 26 with an inside diameter slightly greater than the largest diameter of the select beverage containers to be inserted therein when in use. Likewise, the axial length of the inner cup 16, between the bottom of the flange 25 and the bottom of the cup 16, in one embodiment, is slightly less than the inside depth of the selected outer cup 12. In this manner the inner cup 16 does not "bottom out" against the outer cup bottm 15 before the flange 25 is allowed to seat against the top edge 27. Next, a freezable fluid refrigerant is prepared by means which may include mixing a viscosity increasing agent and water. The refrigerant is placed into the outer cup 12 in a volume which may displace slightly less than all of the space between the inner and outer cups so as to, preferably in one embodiment, leave a small expansion volume 20 adjacent the upper surface of the refrigerant. The inner cup 16 is then inserted into the outer cup 12 and centrally aligned therein with the outer flange 25 seating against the top edge 27. The ring 14 is snapped thereover to provide a holder 10 which may be exposed to freezing temperatures for the solidification of the refrigerant 18. When a cooled beverage container is then disposed within the assembly after the freezing thereof, the container is conductively exposed to an even colder temperature. Since the ring 14 conventionally includes the inwardly extending, deflectable flaps 40, even if the beverage container does not snuggly engage the inner cup 16, the cold air formed therein is substantially trapped by said flaps to facilitate the cooling of the beverage.

After substantial utilization of the holder 10 the frozen state of the refrigerant 18 will be transformed back to a fluid state. Since the outer cup 12 is formed of a foam which may be plastically deformed under malleable foam, a solid seal between it and the inner cup is difficult to insure. With the refrigerant in a liquid state of low viscosity, leakage could be a problem. As mentioned before, to prevent leakage and for other reasons, a viscosity increasing agent is preferably added to the refrigeratable fluid. For purposes of example only, the addition of a water soluble methylcellulose composition to water has been found to operate satisfactorily. Other mterials such as gellatin may also serve. In the assembly of the holder 10 with such a viscosity control agent it has been found to be preferable to mix a warm water and a viscosity increasing material and then immediately utilize it by pouring it into the outer cup 12 and thereafter inserting the inner cup 16 before a highly viscous gelled state occurs. Once the fluid achieves a gellatenous state it also serves to hold the outer and inner cups together to form an integral unit as well as to retard any leakage of the fluid through any small openings remaining. In the event the holder is to be exposed to unusual conditions such as high ambient temperatures for a substantial period of time, it may also be desirable to totally seal the holder with a small amount of adhesive between the stepped portion 22 and the inner wall 24 of the outer cup and/or between the underside of the flange 25 of the inner cup and the upper circular edge of the outer cup.

Referring to FIG. 5, there is shown an alternative embodiment of the holder 10 of the present invention. In this embodiment, the distance between the bottom of the flange 25 (FIG. 2) and bottom edges of the lower body 26 is such as to provide a space between the circular bottom of the outer cup walls 28 and the circular bottom 50 of the inner cup 16. The gellatenous fluid 18 fills the space between the bottom of the outer cup and the bottom 50 of the inner cup to provide an additional volume of freezable fluid. The natural freezing expansion of a water based fluid may tend to increase the distance between the inner cup bottom 50 and the outer cup and thereby disturb the seal between the tops of the inner and outer cups. However, by adjusting the thickness of the bottom region of fluid 18, its expansion upon freezing will be compensated for by the elasticity of the styrofoam walls of the outer cup 12.

While the beverage holder of the present invention is most advantageously employed with beverages packaged in cans or bottles for direct consumption therefrom, it is to be understood that the beverage container holder of the invention can be used for conventional drinking containers. As shown in FIG. 6, the beverage container holder of the invention 10 outwardly comprising an outer cup 12 and a top ring 14, may contain a conventional drinking container 51. Most preferably, the outer walls of the container 51 are shaped to closely engage the inner walls of the inner cup, i.e., they may both by cylindrical or slightly conical. Further, the walls of the container are preferably made of a break-resistant material having a high thermal conductivity such as aluminum and may be formed with slightly conical outer walls to be received by an inner cup 16 having conforming conical inner walls. The container 51 is removable from within the holder 10 for washing. The use of the invention shown in FIG. 6 is particularly adapted for the service of drinks, such as martinis or wine, the dilution of which with the water of melting ice is undesirable or for use in conventional drinks along with ice to extend the time a drink will remain cold after service.

A very important aspect of one embodiment of the invention is the utilization of an outer container 12 which is formed from a lightweight, durable, material which is elastically resilient to slowly or gradually applied stresses of lower magnitude. These characteristics of this material solve many of the problems related to prior art devices. For example, many prior art devices require the existence of an air space in the region of the water based refrigerant to accommodate the consequent expansion thereof upon freezing of the water. The physical characteristics of closed cell foam polystyrene enable the present invention to be assembled without an air space of the refrigerant fluid when frozen. It is axiomatic that water expands upon its transition from a fluid to a solid state, but when contained within a resilient outer container 12 formed of material such as a resilient polystyrene foam in the configuration described herein, such volumetric expansion exerts a gradually applied stress which is accommodated by the resilience of the outer container. This characteristic of the present invention permits the usage of an inner liner 16 formed from a material which is comparitively rigid with respect to the above-described elasticity of the outer container. Thus, the inner walls of the inner cup 16 remain relatively fixed in their cylindrical configuration for receiving a beverage container after the refrigerant is frozen since the physical expansion of the freezable fluid is elastically contained within the outer container.

It should be further understood that other embodiments of the beverage container holder of the invention can be fabricated from outer cups 12 which are formed from other than prior art "dead air" beverage can holders. For example, any outer container of insulative material may be utilized if adapted for receiving an inner cup as defined herein. The outer container may not be perfectly cylindrical but the inner cup should be constructed for being received into said outer container to define a closed, generally annular space between the outer container and the inner cup for confinement of a freezable fluid within said closed space. Such a construction is particularly easy to economically fabricate with the utilization of the press fit stepped region 22 of the inner cup for sealably engaging the outer container.

Referring finally to FIG. 7, there is shown a related embodiment of the invention which comprises a beverage holder containing either a hot or a cold beverage. The container 61 comprises a foam outer cup 12 and a plastic ring cap 14 just like the embodiments previously described. Similarly, the container 61 also includes an inner cup shaped liner 16 having a stepped region 22 and a radially extending flange 25. The cylindrical walls of the lower body 26 are extended upwardly to form a cylindrical, open top drinking lip 62. If it is desired, to employ the container 61 for keeping a hot baverage warm during consumption, the annular space 63 between the inner walls of the outer cup 12, and the outer walls 26 of the inner liner 16 may be left as an insulative dead air space or filled with another heat insulative medium. If it is desired to employ the container 61 for keeping a cold beverage cool during consumption, the annular space 63 is filled with a freezable medium just as in the previously-described embodiments.

It is believed that the operation and construction of the above-described invention will be apparent from the foregoing description. While the refrigerated beverage container holder shown and described has been characterized as being preferred, it will be obvious that various changes and modifications may be made without departing from the spirit and scope of the invention as defined in the following claims.

What is claimed is:

1. A refrigerated holder for a beverage container of the type including a cylindrical outer cup of insulative material closed on one end and open on the other, the circular edges of the open end being covered by a circular retaining ring including a first portion extending radially across the top edges and into the open end with flap portions to position a cylindrical beverage container in axial alignment with said outer cup and a second, cylindrical portion extending from the top of the cup down the outer wall to retain the ring in position around the cup, the improvement comprising:

a cylindrical inner cup having an outer diameter less than the inner diameter of the outer cup to define an annular space therebetween and an inner diameter for receiving the cylindrical walls of a beverage container therein, said inner cup also including a radially extending flange region at the open end for positioning adjacent the top edges of the outer cup beneath the retaining ring to seal the annular space therebeneath;

a freezable fluid positioned within the annular space between the outer walls of the inner cup and the inner walls of the outer cup for absorbing heat from the walls of a beverage container positioned within the inner cup when said fluid is frozen to cool the beverage within the container.

2. An improved refrigerated holder for a beverage container as set forth in claim 1 wherein the outer cup is formed of polystyrene foam and the inner cup is formed of molded plastic.

3. An improved refrigerated holder for a beverage container as set forth in claim 1 wherein the outer cup is formed of polystyrene foam and the inner cup is formed of thin-walled metal.

4. An improved refrigerated holder for a beverage container as set forth in claim 1 wherein said freezable fluid comprises water.

5. An improved refrigerated holder for a beverage container as set forth in claim 4 wherein the water is in a gellatenous state.

6. An improved refrigerated holder for a beverage container as set forth in claim 5 wherein the gellatenous state is produced by the addition of a viscosity increasing agent to said water.

7. An improved refrigerated holder for a beverage container as set forth in claim 6 wherein the viscosity increasing agent is comprised of a methylcellulose composition.

8. An improved refrigerated holder for a beverage container as set forth in claim 1 wherein said radially extending flange region of said inner cup includes a stepped region near the open end of the inner cup having a diameter slightly greater than the inner diameter of the outer cup to snugly engage the inner wall of the outer cup and thereby center the inner cup within the outer cup and a substantially flat radially extending flange having a diameter about equal to the outer diameter of the inner cup extending across the top edges of the inner cup.

9. An improved refrigerated holder for a beverage container as set forth in claim 8 wherein said stepped region is of an axial length greater than the downward deflection of the flap portions of the retaining ring.

10. A holder for cooling a beverage container during consumption comprising:

a cylindrical outer cup of foam material having an open and a closed end said foam being thermally insulative for comfortable handling and elastically resilient for compliance with the physical expansion of a freezable fluid contained thereby upon freezing of said fluid;

a cylindrical inner cup positioned within said outer cup, said inner cup having an outer diameter less than the inner diameter of the outer cup to define an annular space therebetween and an inner diameter for receiving the cylindrical walls of a beverage container, said inner cup also including a radially extending flange region at the open end for positioning adjacent the open end of the outer cup forming a line of juncture therebetween;

outer ring means enclosing the line of juncture between the respective open ends of the inner and outer cups; and a freezable fluid within the space between the outer walls of the inner cup and the inner walls of the outer cup for, upon first being frozen, then absorbing heat through the walls of the inner cup from a beverage container positioned within the inner cup and thereby cool the beverage.

11. A holder for cooling a beverage container during consumption as set forth in claim 10 wherein said radially extending flange region of said inner cup includes a circumferentially disposed, tongue portion for engaging and being embedded in said foam outer cup to assist in sealing the region between the inner and outer cups.

* * * * *